United States Patent
Föhl

[11] 3,796,441
[45] Mar. 12, 1974

[54] SAFETY DEVICE FOR THE PROTECTION OF VEHICLE AND AIRPLANE PASSENGERS

[76] Inventor: Artur Föhl, Schelmenwasenstrasse 68, 7061 Haubersbronn, Germany

[22] Filed: Sept. 28, 1971

[21] Appl. No.: 184,496

[30] Foreign Application Priority Data
Sept. 29, 1970 Germany............................ 2047759

[52] U.S. Cl. ............ 280/150 AB, 137/38, 180/103, 222/3, 222/500, 251/284, 251/297, 251/333
[51] Int. Cl. .............................................. B60r 21/08
[58] Field of Search .......... 280/150 AB; 137/38, 39, 137/45; 251/333, 297, 284; 180/103, 104; 222/3, 500

[56] References Cited
UNITED STATES PATENTS

| | | | |
|---|---|---|---|
| 3,637,110 | 1/1972 | Cirillo | 137/38 |
| 3,628,809 | 12/1971 | Cirillo | 280/150 AB |
| 3,565,100 | 2/1971 | Pfleger | 251/333 X |
| 3,628,550 | 12/1971 | Cirillo | 280/150 AB |
| 2,650,655 | 9/1953 | Neahr et al. | 180/103 X |
| 3,556,556 | 1/1971 | Goetz | 280/150 AB |
| 3,661,299 | 5/1972 | Durstewitz | 137/38 |
| 3,638,964 | 2/1972 | Chute | 280/150 AB |
| 2,755,816 | 7/1956 | Collins | 251/333 X |
| 3,428,076 | 2/1969 | Lowe | 251/333 X |
| 3,101,094 | 8/1963 | McKenzie | 251/333 X |

Primary Examiner—David Schonberg
Assistant Examiner—John P. Silverstrim
Attorney, Agent, or Firm—Walter Becker

[57] ABSTRACT

An inflatable bag safety device for vehicle passengers in which a compressed air container is connected to the bag and has therein a valve member in the form of a piston moveable upon impact of the vehicle, as in a collision, to inflate the bag. An inertia member pivoted to the container and connected to the piston is sensitive to lateral acceleration of the vehicle for urging the piston toward open position.

38 Claims, 7 Drawing Figures

SAFETY DEVICE FOR THE PROTECTION OF VEHICLE AND AIRPLANE PASSENGERS

The present invention relates to a safety device for the protection of passengers in vehicles such as automobiles and airplanes, in cases of accidents.

Experience has shown that the passengers of vehicles equipped with safety belts actually use such safety belts only to a limited extent, or not at all. Therefore, for years industry has endeavored to create a passive safety system which will eliminate the drawbacks of an active protective device. Devices of this type are known in the form of bags which are arranged in front of the passengers and normally are in folded condition. These bags are, in case of an accident, inflated by a gas, as for instance, air, or nitrogen, and are supposed to absorb the inertia movement of the passengers during the accident.

These so-called air bags are furthermore so designed that they empty quickly again and in this way bring about a shock-absorbing effect. The main problem of devices of this type is a safe, always functioning and quickly reacting release system. The following devices have become known in this connection:

a. A gas pressure container which is stationarily arranged in the vehicle communicates through a valve with the folded-together air bag. During a collision, in view of the mass effect of a striker or ignition bolt, an explosive charge is ignited, and the valve is instantaneously opened by the explosion pressure.

b. A second well-known device also operates by the mass effect and, more specifically, in such a way that the valve is actuated electromechanically.

c. According to another suggestion, a radar feeler is mounted in the vehicle which is already prior to the collision controlled electronically and in case of collision opens the valve.

The system referred to above under a) has the drawback that an explosive charge is employed for actuating the valve, which explosive charge, due to outer effects as for instance strong heat, may cause an undesired self-ignition.

The safety of function of the device referred to under b) is assured only as long as a proper current supply prevails.

The system referred to above under c) has the drawback that an article or object passing at slight distance from the vehicle transverse thereto will initiate the radar system without a collision ever having taken place.

It is, therefore, an object of the present invention to provide a device which will be safe and reliable in its function and while overcoming the above mentioned drawbacks, will be inexpensive to produce and will have small dimensions.

These objects and other objects and advantages of the invention will appear more clearly from the following specification in connection with the accompanying drawings, in which.

The safety device according to the invention for the protection of passengers in vehicles such as automobiles and airplanes, with a bag which is normally folded and is inflated in case of accident for absorbing the inertia movement of the passengers, and which also comprises an automatically operable compressed gas container for inflating the bag, is characterized primarily in that the compressed gas container comprises openings arranged along one and the same axis, which openings are held closed in condition of readiness by a master piston which on the driving direction side forms an axial piston and on the gas exit side forms a dish piston. The said dish piston forms a unit with the oppositely located axial piston. The diameter of the axial piston located in the driving direction must always be less than the diameter of the dish-shaped piston.

The dish-shaped piston is, toward the outside, provided with a cylindrical guiding member which with slight play is guided in the closure bore. This guiding member is, starting from the outer edge at about half its length, provided with large recesses so that within this region only web-like guiding strips remain.

If now the compressed gas container is filled, the poppet valve is closed in view of the prevailing surface difference. The differential pressure must be so selected that in case of a collision at a certain speed, the mass responsive force of the master piston in the driving direction will open the poppet valve while momentarily pressure gas passes in front of the poppet valve.

Inasmuch as the guiding diameter is less than the diameter of the poppet valve, the master piston will in driving direction by the gas pressure, be subjected to an additional acceleration and thus will axially be displaced in driving direction to such an extent that the gas can flow from the container through the recesses on the piston in an unimpeded manner and can exhaust against the driving direction.

In order to prevent a fluttering of the master piston, the circumference of the axial piston is provided with a groove which receives a spring ring resting in the bore. During the opening operation, the master piston is instantaneously displaced in the driving direction so that the springing spring ring will lock the piston in its end position against the conduit.

In view of this design, it will be appreciated that during a frontal collision, a fast and safe filling of the air bag will be assured. If a lateral collision occurs, for instance by the car driving against a wall or when the car turns over laterally, it will be appreciated that with the same given collision speed, the device becomes ineffective because the full mass force is no longer available for controlling the valve. The further development of the invention is based on the following principal finding, by arranging additional masses which react only to lateral retardations, (lateral with regard to the driving direction). These additional masses will make up for the remaining portion of the mass force necessary for an opening of the valve without affecting the fundamental system. In this connection, it is to be noted that the system will not open the valve at high accelerations perpendicularly to the driving path, caused for instance by holes in the road, or by high speed passing over curbs.

In order to obtain an opening also under the particular circumstances just mentioned, it is suggested according to a further development of the invention to place a supporting ring secured against rotation upon the conduit section extending in the driving direction and pertaining to the compressed gas container. This supporting ring has bearing bores arranged perpendicularly with regard to the plane of the driving path. A pot-shaped mass body is pivotally journalled in these bores. The bottom of the mass body,which bottom points in the driving direction, has its central portion provided with a bore for receiving a flanged bolt. Between the bore and the shank of said flanged bore there is a slight play. The said bolt is suspended on the master piston on the side of the driving direction in such a way that in closed condition of the compressed air container, the flange or collar engages the surface of a disc which is connected to the piston by means of a spring ring. Preferably, this engagement-setting is obtained by a threaded nut provided at the shank end of the flanged bolt. The suspension space is so dimensioned that when the mass body pivots about the certain predetermined angle, the flange of said flanged bolt can freely tilt or pivot at the diameter and in axial direction toward the compressed gas container. If the flange-engaging surface is located approximately within the region of the pivot axis of the mass body, it will be appreciated that the mass body will be pivoted in response to laterally occurring retardations and that by a lever effect on the suspension point, the master piston will in the driving direction be pulled forward to a slight extent so that gas under pressure will pass in front of the poppet valve with the result that the valve will open in the described manner.

By correspondingly dimensioning the mass body, there will thus be obtained the possibility of producing a combined protective device at low cost which offers a maximum reliability.

Figure 1:
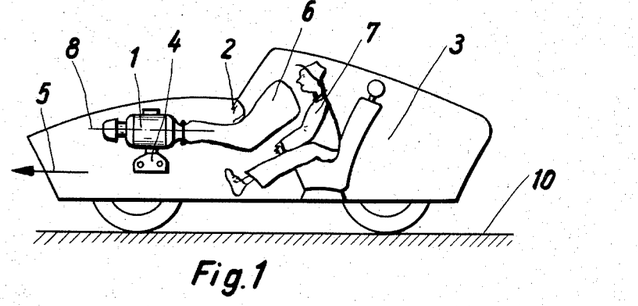
FIG. 1 diagrammatically shows a longitudinal section through a vehicle with built-in protective device according to the invention.

Referring now to the drawings, it will be seen from FIG. 1 that the protective device 1 is preferably fixedly connected to the vehicle 3 in front of the dashboard 2. In a direction opposite to the driving direction 5, the air bag 6 for protecting the passengers 7 is connected to the protective device 1. The axis 8 of the mass of the master piston 9 is approximately parallel to the driving path 10 and is arranged in driving direction during straightforward drive with regard to the vehicle 3.

Figure 2:
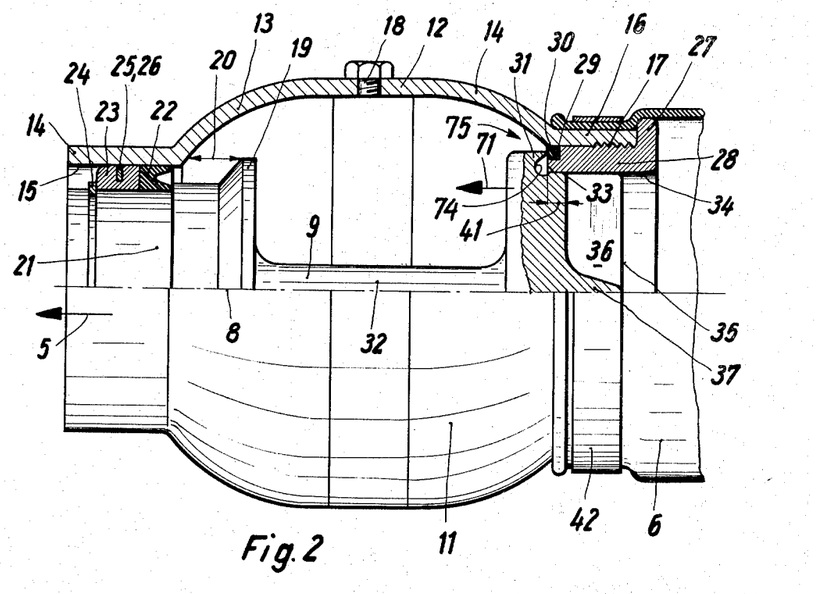
FIG. 2 is a partial longitudinal section through the protective device according to the invention, for frontal collision and shows the device in closed condition.

The protective device 1 comprises a compressed air container 11,the central portion 12 of which merges in a tubular manner with the ball-shaped bottoms 13 and 14. In driving direction 5, the bottom 13 is followed by a pipe section 14, the bore 15 of which forms a pneumatic cylinder. Provided on the bottom 14 is a somewhat larger pipe section 16 which, from the outside over a certain length, is provided with interior thread 17. For purposes of filling the compressed air container 11, there is provided a filling device 18. The master piston 9 has a collar 19 of a diameter which is somewhat greater than the diameter of the bore 15, for limiting the opening stroke 20 on the inside of the bottom 13. The piston part 21 has arranged thereon a radial seal 22 which, by means of a slide ring 23, rests on the spring ring 24. The circumference of the slide ring 23 is provided with a groove 25 which receives a spring ring 26 resting against the wall of the bore 15. A closure member 28 is screwed into the pipe section 16, said closure member 28 being of sleeve form with a collar 27. The front end of the closure member 28 is provided with an extension 29 for receiving a radially sealing sealing ring 30. Ring 30 also serves for axially sealing the dish-shaped piston 31 which latter through the bolt-shaped central portion 32 forms together with the piston part 21 the master piston 9.

The bore 15 of the cylinder located in driving direction 5 must always be slightly smaller than the sealing diameter of the dish-shaped piston 31. On the dish-shaped piston 31 toward the outside, there is provided a cylindrical guiding member 33 which is guided with slight play in the closure member bore 34. Starting from the outer edge 35, approximately over half the length, there are provided large recesses 36 for the gas exit. Within this region, only web-like guiding strips 37 remain.

The smaller the closure part bore 34, the greater will, at the time of opening, the additional acceleration force be which acts upon the master piston in the driving direction 5, which means in opening direction.

Figure 3:
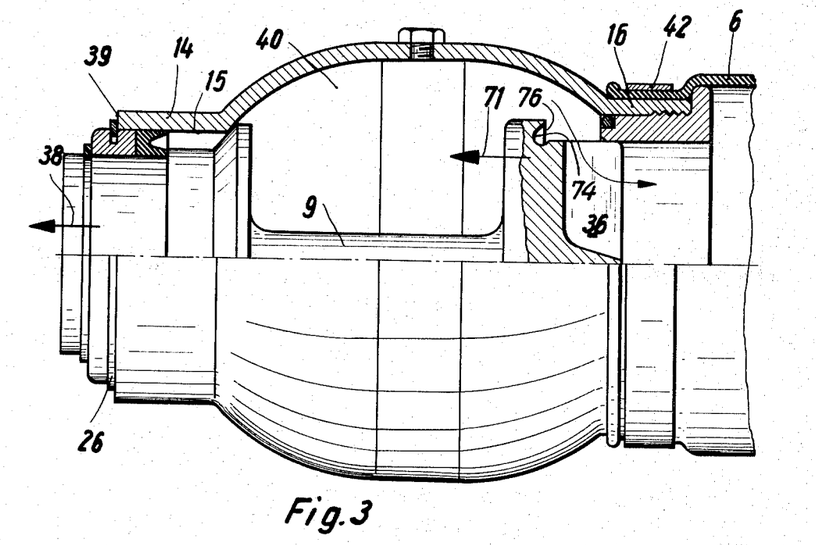
FIG. 3 is a longitudinal section through a portion of the protective device according to the invention for frontal collision while showing the device in opened condition.

FIG. 3 shows the protective device 1 in opened condition.

If master piston 9 is displaced in view of the mass effect plus the gas pressure acceleration in the direction 38, the spring ring 26 will,after leaving the bore 15, be free and will spring up and at the end face 39 of the pipe section 14 fix the master piston 9 in its opening position. The compressed gas 40 will, after passing through the partial piston stroke 41, escape in an unimpeded manner through the recesses 36 and the air bag 6, which latter by means of a bandage 42 is connected to the pipe section 16. By a corresponding design of the recesses 36, it is possible to adapt the flow character of the outflowing gas to the respective requirements.

Figure 4:
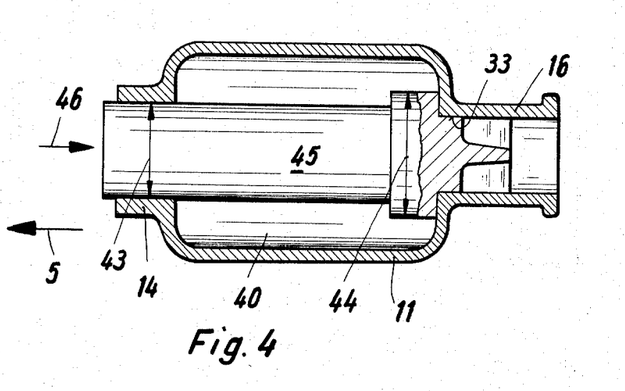
FIG. 4 shows a longitudinal section through the protective device according to the invention in a simplified manner.

FIG. 4 shows the system in a simplified manner in condition of readiness.

Inasmuch as the diameter 43 of the axial piston is less than the dish piston diameter 44, piston 45 will be pressed in the direction 46, i. e. sealing position, by a force which equals the product of the surface difference times gas pressure 40.

The construction shown in FIGS. 1 to 4, operates highly satisfactorily in response to frontal collisions. FIG. 2 illustrates start positioning of the components of the protective device. The cylindrical guiding member 33 in effect is a first valve part carrying out the opening movement; this valve part 33 provides an auxiliary piston surface 74 sealing off the inlet side gas pressure 40 in the starting position thereof (FIG. 1); the seal 30 thereof before reaching the open position (FIG. 3) of this valve body 33 is lifted in an intermediate position 72 (FIG. 6) in such a manner that the inlet side engaging gas pressure 40 is effective upon the first valve part 33 in the opening direction of movement indicated by arrow 71. Accordingly, there is first a movement of the valve part 33 carrying out the opening movement by a small piece or extent due to the impact so that the auxiliary piston surface 74 originally not engaged by pressure becomes subjected to a gas pressure 40 by way of lifting of the seal 30. This gas pressure 40 is in the entire, inlet side prevailing gas pressure in the gas pressure source 11 since in this phase the control valve means 28, 33 respectively 28a, 33a has not yet opened and accordingly the inlet side gas pressure 40 also cannot yet decrease or diminish. Thereby the valve parts 33 respectively 33a carry out the opening movement in this phase and are subjected to an additional acceleration in direction toward the open position by way of the effective gas pressure so that the same does not become moved exclusively by way of opening forces arising during the impact as to the open position. This results in a considerable shortening of the opening time of the control valve and thereby results in a considerable increase in the filling speed of the pneumatic impact member so that an essentially greater safety is made possible. The first piston member 33 also includes a portion 33a identified in FIG. 6 adjacent to an axial gap 72 noted subsequently herein. Also the first piston or cylindrical guiding member 33 in a location radially outwardly from the auxiliary piston 74 has an annular edge 76 as shown in FIG. 3 and an arrow 75 in FIG. 2 represents the closed position thereof in the valve structure, whereas a further arrow (unnumbered) in FIG. 3 shows the full flow of pressurized medium during open position of the parts. In FIG. 2 there is designated a rear piston surface 77 engaged by a pressure medium during closed or starting position. The master piston 9 includes a portion 21a as marked in FIG. 6 of the drawings defining a suspension space 73 noted subsequently herein. When a lateral collision occurs for instance, by driving against a wall, it will be appreciated that at the same impact speed, the mass force of the master piston 9 bringing about the opening of the valve will be reduced in conformity with the impact angle and thus the valve will not be opened.

Figure 5:
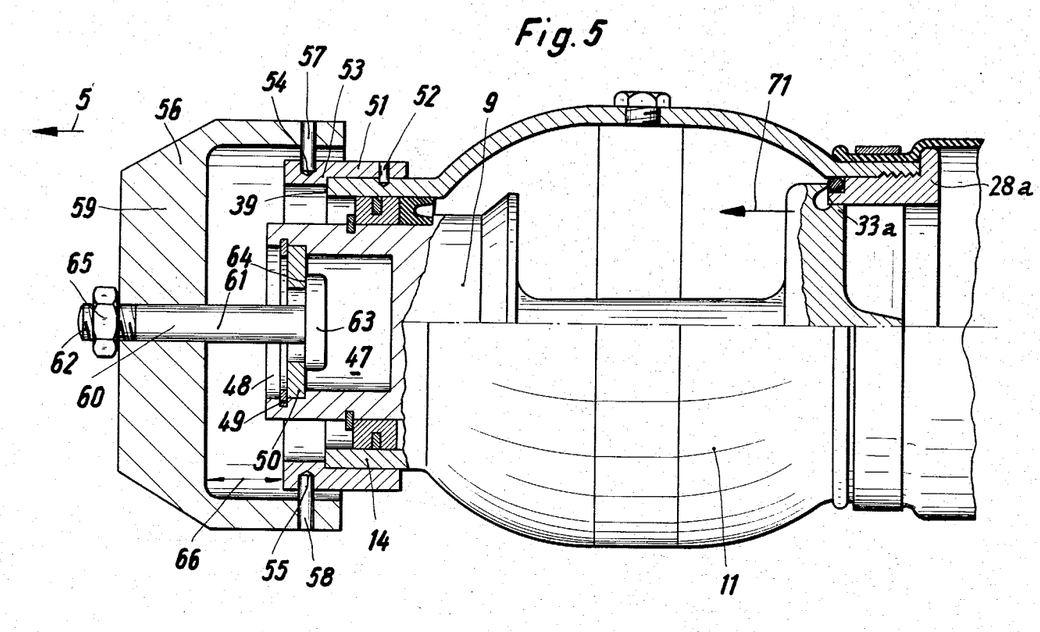
FIG. 5 represents a section through a pivotable mass body according to the invention, with the device in closed condition.
Figure 6:
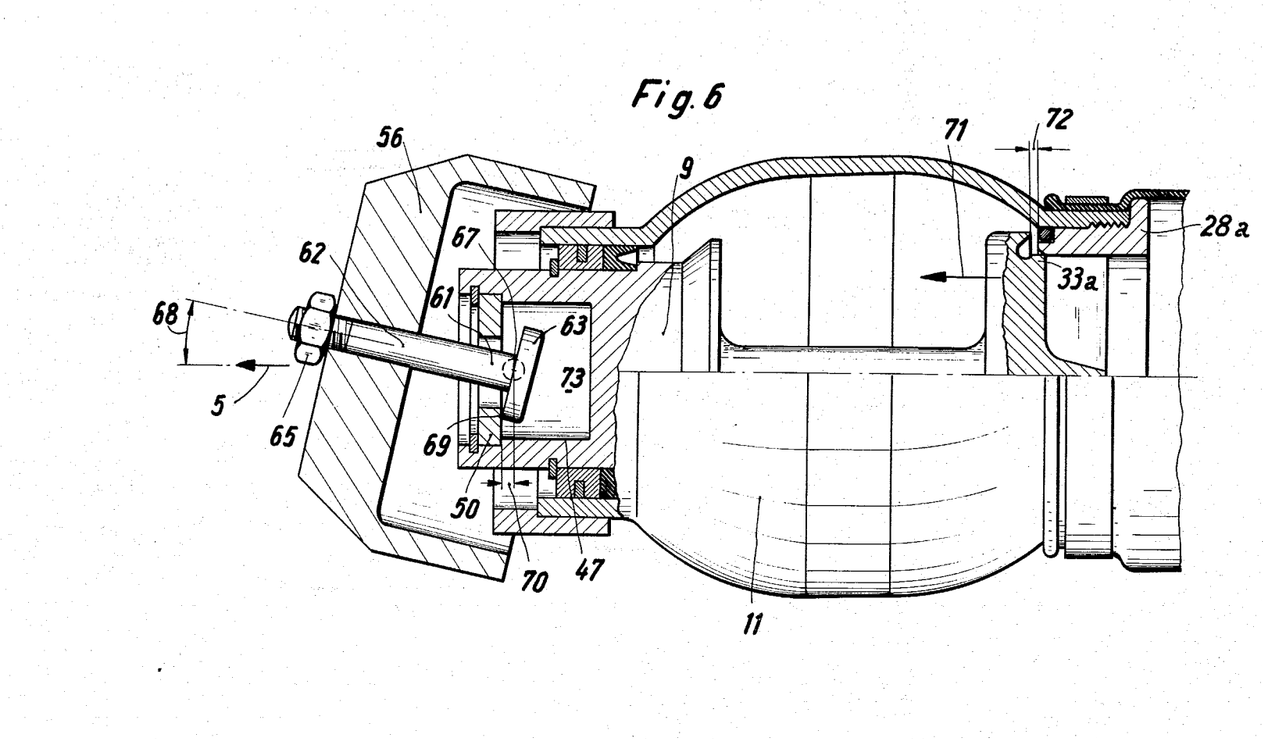
FIG. 6 is a top view of the pivotable mass body with a section through the device showing the latter at the time when the valve opens.
Figure 7:
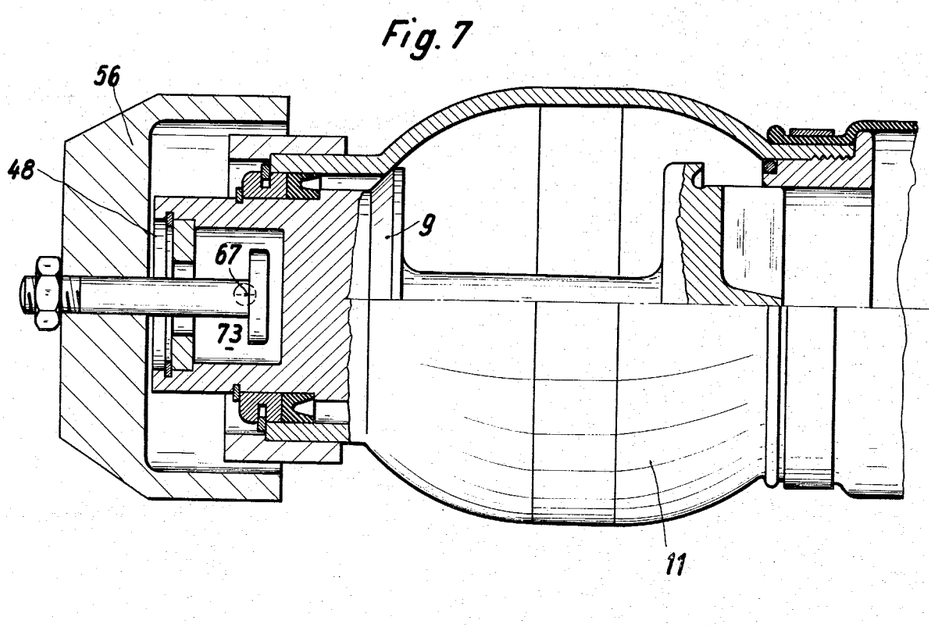
FIG. 7 is a top view of the pivotable mass body showing the device in opened condition.

FIGS. 5, 6 and 7 show a further development of the invention in which, by arranging additional masses which respond only to retardations occurring laterally with regard to the driving direction, the mass force residual portion necessary for opening the valve will be furnished without affecting the basic principle described in connection with FIGS. 1-4.

Also in FIG. 5, the compressed air container 11 is designed with pertaining valve elements as shown in FIGS. 1 to 4. Merely the master piston 9 is, on the driving side 5, provided with a bore 47 the open end face 48 of which is closed by means of a disc 50 which is arrested axially by a spring ring 49.

The pipe section 14 of the compressed air container 11, which pipe section 14 is located in the driving direction 5, has arranged thereon a supporting ring 51 which is secured against turning by means of a pin 52. By means of the extension 53, the supporting ring 51 rests with regard to the end face 39 axially against the pipe connection 14. Within the region of the extension 53, the supporting ring 51 has bearing bores 54 and 55 which are arranged perpendicularly with regard to the plane of the driving path. In these bearing bores, there is pivotally journalled the mass body 56 which may be pot-shaped; this pivotal journalling is effected by means of bolts 57 and 58.

In the bottom 59 of the mass body 56 located in the driving direction 5, there is a bore 60 which, with slight play, receives a shank 61 of the flanged bolt 62. The flange 63 of the bolt 62 is in ready position of the device along a sur-face 64, as seen in the driving direction 5 engaging the disc 50.

The shank end of the flanged bolt 62 is provided with a thread for adjusting the engaging position by means of a threaded nut 65. Between the end face 48 of the master piston 9 and the inside of bottom 59 on the mass body 56 there must be provided a freeway 66 which corresponds at least to the opening stroke of the master piston 9. This freeway 66 must be present in order to permit the master 9 to move axially in an unimpeded manner in response to a frontal collision.

FIG. 6 shows a top view of the pivotable mass body 56 with a partial section through the device at the time when the valve opens.

The mass body 56 with its axis of rotation 67 has at this time pivoted by an angle of 68°. Inasmuch as the flanged bolt 62 is suspended between the disc 50 and the mass body 56 without noticeable play, it will be appreciated that by the lever effect of the flange edge 69 of bolt 62, the master piston 9 will be moved axially by the distance 70 in the opening direction 71 so as that on the dish piston there will form an axial gap 72 of the same magnitude, and the opening of the valve will be initiated as described above. The suspension space 73 formed by bore 47 is so selected that when pivoting the mass body 56 about the maximum angle 68, the collar 63 of the bolt 62 stands free radially and axially in closing direction. Between the bore of the disc 50 and the shank 61 of bolt 62, a play must likewise be present in the pivoted position of the mass body 56.

FIG. 7 shows the open condition. It will be seen that during the opening operation, by means of the end face 48 of the master piston 9, the mass body 56 was pressed back approximately into its starting position. By increasing the freeway 66 and enlarging the suspension chamber 73 in axial direction, it would also be possible to have the mass body 56 remain in its pivotable position during the opening phase. If desired, the mass body 56 may be of any desired configuration provided the axis of rotation 67 is perpendicular to the plane of the driving path.

It is, of course, to be understood that the present invention is, by no means, limited to the particular showing in the drawings, but also comprises any modifications within the scope of the appended claims.

What is claimed is:

1. An inflatable bag safety device for passengers of a vehicle which has a normal forward driving direction comprising: a bag in front of the passenger position foldable when uninflated and when inflated expanding in front of the passenger position to absorb vertical energy of the passenger, a comprssed air container having a forward opening and a rearward opening closed in readiness in respect of the normal forward driving direction of the vehicle, said openings being coaxial, a master piston in said container having a cylindrical piston portion slidably sealingly engaging said forward opening, a disc piston portion on said master piston abuttingly engaging said container about the periphery of said rearward opening and on the forwardly facing side of said opening, said rearward opening being connected to said bag, and means connected to the forward end of said master piston outside said container responsive to lateral acceleration of said container for moving said master piston in the forward direction to lift said disc portion away from the region of the container engaged thereby, said means comprising a mass member pivoted to said container on an axis perpendicular to the longitudinal axis of said master piston and flexibly connected to said master piston.

2. A safety device according to claim 1 in which said mass member is annular, and pivot pins pivotally supporting said mass member on the forward end of said container on said axis perpendicular to the longitudinal axis of said master piston and rearwardly of the center of gravity of said mass member.

3. A safety device according to claim 1 in which said mass member is pot-shaped with the closed side toward the front, and pivot pins near the rear end of said mass member pivotally connecting said mass member to said container on said axis perpendicular to the longitudinal axis of said master piston.

4. A safety device according to claim 3 in which the closed side of said mass member is centrally bored, and a bolt fixed in said bore and extending rearwardly therefrom and having a head disposed in the forward end of said master piston.

5. An inflatable bag safety device for passengers of a vehicle which has a normal forward driving direction comprising: a bag in front of the passenger position foldable when uninflated and when inflated expanding in front of the passenger position to absorb vertical energy of the passenger, a compressed air con-tainer having a forward opening and a rearward opening in respect of the normal forward driving direction of the vehicle, said openings being coaxial, a master piston in said container having a cylindrical portion slidably sealingly engaging said forward opening, and a disc portion on said master piston abuttingly engaging said container about the periphery of said rearward opening and on the forwardly facing side of said opening, said rearward opening being connected to said bag, means connected to the forward end of said master piston outside said container responsive to lateral acceleration of said container for moving said master piston in the forward direction to lift said disc portion away from the region of the container engaged thereby, said means comprising a mass member pivoted to said container on an axis perpendicular to the longitudinal axis of said master piston and flexibly connected to said master piston, said mass member being pot-shaped with the closed side toward the front, and pivot pins near the rear end of said mass member pivotally connecting said mass member to said container on an axis perpendicular to the longitudinal axis of said master piston,the closed side of said mass member being centrally bored, and a bolt fixed in said bore and extending rearwardly therefrom and having a head disposed in the forward end of said master piston, said bolt being axially displaceable in said bore.

6. An inflatable bag safety device for passengers of a vehicle which has a normal forward driving direction comprising: a bag in front of the passenger position foldable when uninflated and when inflated expanding in front of the passenger position to absorb vertical energy of the passenger, a compressed air container having a forward opening and a rearward opening in respect of the normal forward driving direction of the vehicle, said openings being coaxial, a master piston in said container having a cylindrical portion slidably sealingly engaging said forward opening, and a disc portion on said master piston abuttingly engaging said container about the periphery of said rearward opening and on the forwardly facing side of said opening, said rearward opening being connected to said bag, means connected to the forward end of said master piston outside said container responsive to lateral acceleration of said container for moving said master piston in the forward direction to lift said disc portion away from the region of the container engaged thereby, said means comprising a mass member pivoted to said container on an axis perpendicular to the longitudinal axis of said master piston and a bolt with head end flexibly connected to said master piston, said mass member being pot-shaped with the closed side toward the front, and pivot pins near the rear end of said mass member pivotally connecting said mass member to said container on an axis perpendicular to the longitudinal axis of said master piston, the forward end of said master piston being provided with an axial recess for receiving the head end of said bolt, and a washer fixed in said recess through which said bolt extends.

7. A safety device according to claim 6 in which the diameter of said disc portion is greater than the diameter of said cylindrical portion.

8. A safety device according to claim 7 in which said container contains compressed air, said compressed air biasing said master piston rearwardly in said container, said compressed air in flowing past said disc portion toward said bag upon forward displacement of said master piston in said container momentarily urging said master piston in the forward direction in said container.

9. A safety device according to claim 8 in which said disc portion end of said master piston includes a projection extending into said rearward opening and smaller in diameter than said disc portion.

10. A safety device according to claim 9 in which said projection is provided with axial recesses extending from the rearward end thereof toward said disc portion.

11. A safety device according to claim 10 in which the axial portion of said extension between said recesses slidably engage said rearward opening.

12. A safety device according to claim 7 in which the mass of said master piston is so selected that upon a collision of the vehicle at a predetermined speed the unbalanced force acting on said master piston due to the compressed air in the container will be overcome and the master piston will be displaced forwardly in said container.

13. A safety device according to claim 6 in which said container contains compressed air and said master piston is biased rearwardly in said container by said compressed air.

14. A safety device according to claim 6 which includes latch means to latch said master piston to said container when in a forwardly displaced position therein.

15. A safety device according to claim 6 which includes means supporting said container in a vehicle with said openings aligned in the fore and aft direction of the vehicle and with the forward one of said openings toward the front of the vehicle.

16. A safety device according to claim 6 in which said master piston comprises a collar adjacent said cylindrical portion and larger in diameter than said cylindrical portion to abut the container and halt the master piston in a forwardly displaced position in said container.

17. A safety device according to claim 6 in which the mass of said master piston and the influence of said mass member on said master piston are cumulative under certain circumstances to provide for reliable forward displacement of said master piston in said container.

18. A safety device according to claim 6 in which said bolt is smaller in diameter than the hole in said washer while the head of said bolt is larger in diameter than the hole in said washer.

19. A safety device according to claim 18 in which the forward side of the head of the bolt rests on the rearward side of said washer under normal operating conditions of the vehicle.

20. A safety device according to claim 19 which includes a nut threaded on said bolt to adjust the bolt axially in said mass member.

21. A safety device according to claim 18 in which said bolt and master piston are coaxial.

22. A safety device according to claim 19 in which the rearward side of said washer is substantially coplanar with the pivot axis of said mass members.

23. A safety device according to claim 6 in which said bolt and the head thereon are free of restraint except for engagement of the head with the rearward side of said washer in all tilted positions of said mass member.

24. A safety device according to claim 6 in which the axial clearance between the forward end of said master piston and said mass member is greater than the maximum forward displacement of said master piston in said container in all tilted positions of said mass member.

25. A safety device for impact protection on a vehicle including a compressed air container; a pneumatically inflated impact member having a fill opening; and a control valve means operatively interconnecting said container and said fill opening; said valve means including first and second valve portions relatively movable opposite to each other from a closed position, preventing communication of said compressed air from said container to said inflatable member, to an open position, providing said communication; an auxiliary piston surface provided to move with said first valve portion, and a seal means, provided to move with said second valve portion, for sealing said auxiliary piston surface; whereby initial relative movement of said first and second valve portions causes said auxiliary piston surface to move away from sealing engagement with said seal means, said initial movement taking place before said first and second valve portions arrive at said opened position and enabling compressed air to contact said auxiliary piston surface to aid in continued movement of said first and second valve portions to said opened position; said valve means further including a master piston connected to said first valve portion and extending through said container, two mass bodies operatively connected to said master piston, said mass bodies being responsive to impact forces to move said master piston within said container along a guided path to move said first and second valve portions towards said opened position, said two mass bodies moving in two separate directions approximately normal to each other, in response to impact forces acting along those directions whereby impact in a first direction causes only a first one of said two mass bodies to move, and impact in a second direction causes only a second one of said two mass bodies to move, and impact in a direction between said first and second directions causes proportional movement of both said two mass bodies.

26. A device according to claim 25, in which said first one of said mass bodies is formed by said master piston included with said first valve portion and said second one of said mass bodies is jour-nalled on said compressed air container of said second valve portion.

27. A device according to claim 25, in which said second one of said mass bodies is pivotally journalled on said container about a pivot axis spaced from center of gravity thereof approximately at right angles and transverse to direction of impact pertaining thereto.

28. A device according to claim 26, in which said second one of said mass bodies is movably journalled relative to said first valve portion with which there is mechanical interconnection to effect actuation.

29. A device according to claim 28, in which there is a bolt rigidly secured to said second one of said mass bodies movably journalled relative to said first valve portion, a disc connected with said first valve portion and against which said bolt is supported, and a flange edge of said bolt located transverse to longitudinal axis of said bolt in spaced relationship from said pivot axis, the longitudinal axis of said bolt intersecting said pivot axis.

30. A device according to claim 29, in which there is a further disc provided with a guide piston forming said flange edge and passed through said bolt whereby said bolt engages under pressure against a side of the further disc of said flange edge located remote from fastening location on said second one of said mass bodies.

31. A device according to claim 30, in which there is surface engagement of said flange edge against said further disc in sealed condition of said auxiliary piston surface.

32. A device according to claim 30, in which said bolt has a longitudinal axis coinciding with the axis of said guided path in sealed condition of said auxiliary piston surface.

33. A device according to claim 29, in which a forward end of said master piston is provided with an axial recess for receiving the head end of said bolt, and a washer fixed in said recess through which said bolt extends.

34. A device according to claim 33, in which a rearward side of said washer is substantially coplanar with said pivot axis.

35. A device according to claim 33, in which said bolt is smaller in diameter than the hole in said washer while flange edge of said bolt is larger in diameter than the hole in said washer.

36. A device according to claim 28, in which said first valve portion is adjustable relative to said second one of said mass bodies and capable of being secured against direction of opening movement.

37. A device according to claim 36, in which there are threaded means whereby said bolt is adjustable in longitudinal direction thereof relative to said second one of said mass bodies.

38. A device according to claim 28, in which said second one of said mass bodies is embodied as a cup-shaped hollow body which at least partially surrounds said compressed air container providing said second valve portion.

* * * * *